United States Patent [19]
Fritz

[11] Patent Number: 5,309,142
[45] Date of Patent: May 3, 1994

[54] ELECTRONIC FLASHER UNIT

[75] Inventor: Andreas Fritz, Brackenheim, Fed. Rep. of Germany

[73] Assignee: Temic Telefunken microelectronic GmbH, Heilbronn, Fed. Rep. of Germany

[21] Appl. No.: 841,415

[22] Filed: Feb. 26, 1992

[30] Foreign Application Priority Data

Apr. 25, 1991 [DE] Fed. Rep. of Germany ....... 4113455

[51] Int. Cl.$^5$ .............................................. B60Q 1/52
[52] U.S. Cl. .................................... 340/471; 340/472; 340/477; 340/478; 340/479
[58] Field of Search ............... 340/471, 472, 475, 477, 340/478, 479

[56] References Cited

U.S. PATENT DOCUMENTS

| | | | |
|---|---|---|---|
| 4,037,195 | 7/1977 | Wojslawowicz | 340/471 |
| 4,155,069 | 5/1979 | Mason | 340/471 |
| 4,380,753 | 4/1983 | Gant | 340/471 |
| 4,821,018 | 4/1989 | Leistenschneider et al. | 340/471 |
| 4,972,174 | 11/1990 | Onan et al. | 340/471 |

Primary Examiner—John K. Peng
Assistant Examiner—Nina Tong
Attorney, Agent, or Firm—Spencer, Frank & Schneider

[57] ABSTRACT

An electronic flasher unit for one or more flashing lamps activated by flasher switches is described. The flasher unit has at least three control inputs and an integrated circuit for controlling a flashing relay with relay contacts. In addition, further switching means are provided that can be used to alter the operating state of the integrated circuit as a function of the switch settings of the flasher switches and the ignition switch.

16 Claims, 3 Drawing Sheets

ELECTRONIC FLASHER UNIT

BACKGROUND OF THE INVENTION

Flashing indicators in motor vehicles are still often based on mechanical flasher units, in which mechanical contacts are closed when the flasher switches (hazard warning flasher switch, turn indicator switch) are actuated, and the flashing function is made possible by bimetallic contacts. For each lamp circuit, two separate units—a separate unit for each flashing direction—must be provided. In addition, there are already electronic three-terminal flasher units available that have only one control input, namely the turn indicator switch; the hazard warning flashing function is achieved with an additional mechanical switch.

SUMMARY OF THE INVENTION

The object underlying the invention is to broaden the application of electronic flasher units.

This object is attained in an electronic flasher unit for controlling flashing lamps and connectable to a battery, an ignition switch connected to the battery, a turn indicator switch, a hazard warning flasher switch, and a grounding point. The electronic flasher unit comprises a battery terminal connectable to the battery, a ground terminal connectable to the grounding point, at least a first, second, and third control input terminals connectable respectively to the ignition switch, the turn indicator switch, and the hazard warning flasher switch, a flashing relay having relay contacts that are connected respectively to the second and the third control input terminals, an integrated circuit, a plurality of resistors, and a switching means. The integrated circuit has a first connecting pin which controls the flashing relay, a second connecting pin which is a measuring input and is connected to the relay contacts and is also connected, via a measuring resistor, to the battery terminal, a third connecting pin which is a hazard warning flasher input and is connected, via an inner resistor which is inside the integrated circuit, to the second connecting pin and is also connected, via a first resistor, to the third control input terminal, and a fourth connecting pin which is a turn indicator input and is connected, via a second resistor, to the second control input terminal. The plurality of resistors is coupled to the first, second, and third control input terminals, wherein the plurality of resistors output voltage drops in response to the input of at least a first, a second, and a third switch setting signal from the first, second, and third control input terminals, respectively. The switching means is within the integrated circuit and is coupled to the plurality of resistors via connecting pins of the integrated circuit, to change the operating state of the integrated circuit in response to the voltage drops from the plurality of resistors.

The flasher unit in accordance with the invention combines a number of advantages:

The flasher unit has more than three terminals, i.e., it can be used for applications with at least one control input.

The unit has an integrated circuit with preferably eight connecting pins in an 8-pin housing, for example, a DIP housing or an SO 8 housing. This results not only in a low space requirement, but also in cost/price benefits.

With the hazard warning flasher switch closed, no increase of the flashing frequency—even in the case of lamp defects is possible. The hazard warning flashing function is assured even when the ignition is switched off.

With the ignition switch open (ignition switched off), the quiescent current input of the circuit is very low, even when the turn indicator switch is closed.

BRIEF DESCRIPTION OF THE DRAWINGS

The invention is described in greater detail on the basis of an embodiment, an electronic flasher unit for four flashing lights with five terminals and three control inputs.

DESCRIPTION OF A PREFERRED EMBODIMENT

Figure 1:
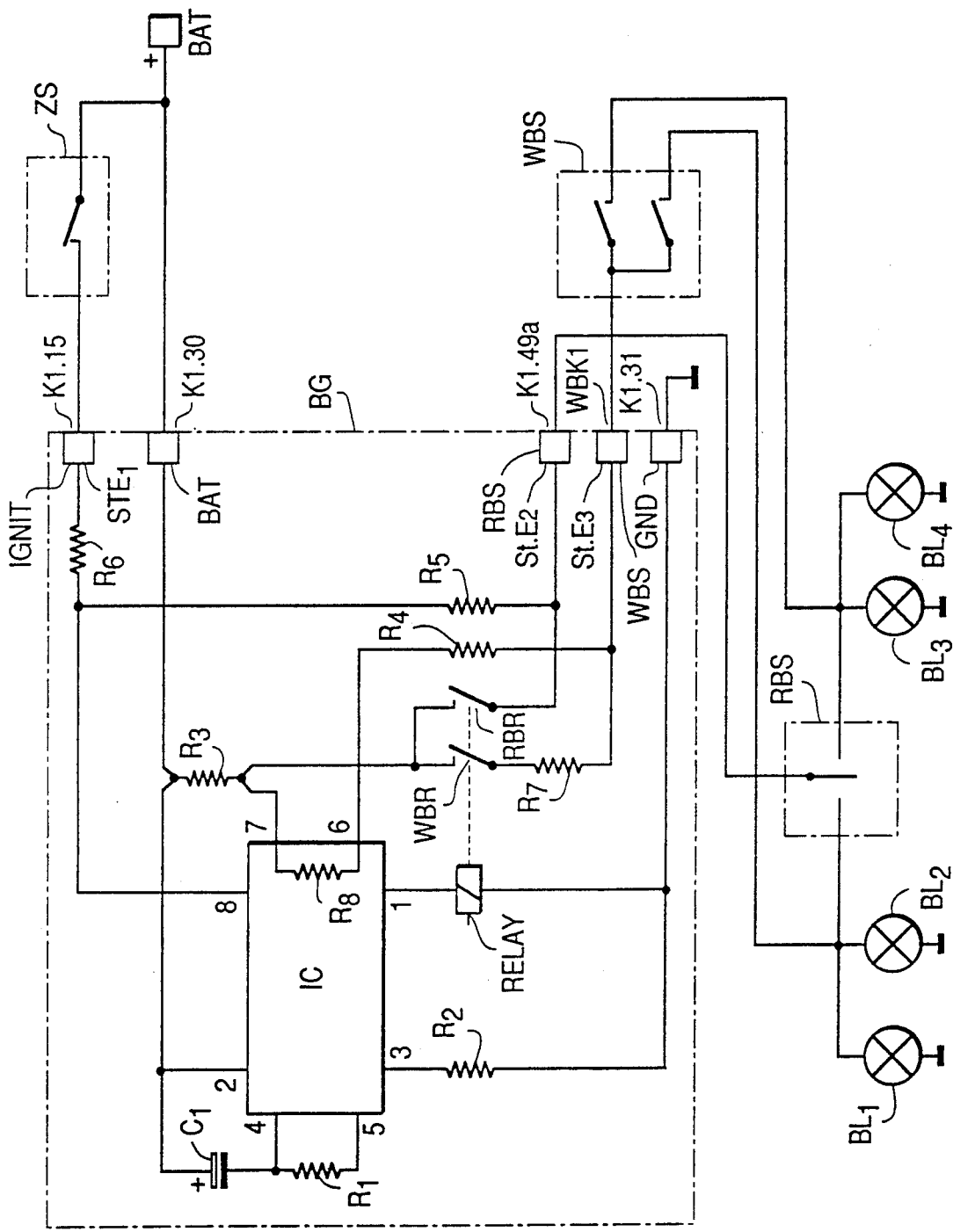
FIG. 1 is the principle circuit diagram of the flasher unit.

In accordance with the principle circuit diagram in FIG. 1, the electronic flasher unit BG has three control inputs ignition IGNIT terminal 15), turn indicator switch (RBS, terminal 49a) and hazard warning flasher switch (WBS, terminal WBK1.); further terminals provided in addition to these three control inputs are the battery (BAT, terminal 30) and reference potential (GND, terminal 31). The integrated circuit IC of the electronic flasher unit has eight external connecting pins, i.e. it can be accommodated in an 8-pin DIP housing or SO 8 housing. The connecting pins provided are, for example, the relay output 1, a connection 2 for the supply voltage, a connection 3 for the reference potential of the IC, two oscillator inputs 4 and 5, the hazard warning flasher input 6, a measuring input 7 and the turn indicator input 8 (input for the terminal 15). The relay output 1 triggers the relay with the two relay contacts WBR and RBR. The oscillator inputs 4, 5 are used to fix the flashing lamp frequency. The hazard warning flasher input 6 is used to control the IC when the hazard warning flasher switch WBS is closed. The measuring input 7 is used in conjunction with the hazard warning flasher input 6 to activate/deactivate the IC and to pick up the measurement signal. The turn indicator input 8 is used to control the IC when the turn indicator switch (RBS) is closed and to activate the IC when the ignition is switched on. The flashing lamps $BL_1$-$BL_4$ are activated using the two relay contacts RBR or WBR when the flasher switches are closed (turn indicator switch RBS or hazard warning flasher switch WBS respectively) ZS is the ignition switch. The IC is wired externally to the resistors $R_1$ to $R_7$ and the capacitor $C_1$. The RC element $R_1$, $C_1$ determines the flashing lamp frequency, the resistors $R_3$, $R_4$, $R_5$, $R_6$ and $R_7$ and the voltage drops caused at these resistors fix the input voltages or input signals at the connecting pins 6, 7 and 8 of the IC, which controls the state of the IC. The resistors $R_4$ and $R_5$ serve additionally, along with to the resistor $R_2$—as protective resistors against disturbing pulses and incorrect polarity.

Figure 2:
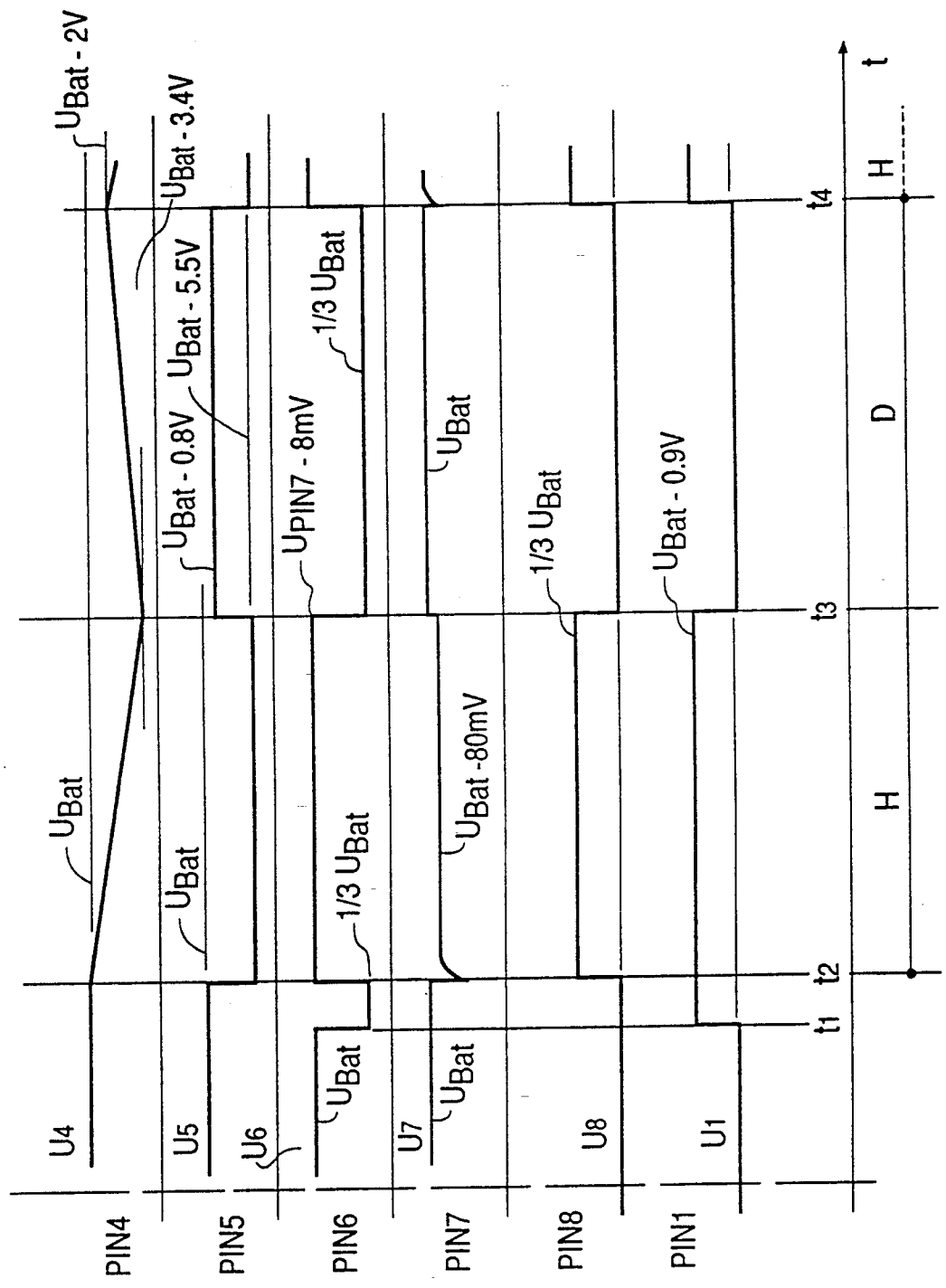
FIG. 2 shows the timing of the voltage values at the connecting pins of the integrated circuit.

The operating states of the flasher unit are described on the basis of FIG. 2, in which are shown,—from top to bottom, the timing of the voltages during the hazard warning flashing operation at the connecting pins 4, 5 (oscillator inputs), 6 (hazard warning flasher input), 7 (measuring input), 8 (turn indicator input) and 1 (relay output) The following operating states of the flasher unit can be distinguished:

a) Stand-by operation ($t \leq t_1$)

With the ignition switched off (ignition switch ZS open) and the hazard warning flasher switch WBS open, the voltages $U_8$ at the turn indicator input 8, $U_1$ at the relay output 1, and $U_3$ have the same value as the reference potential, and all other connecting pins are at the same level as the battery voltage $U_{Bat}$.

The power input of the IC is kept very low by the measuring input 7 and the hazard warning flasher input 6 regardless of the setting of the turn indicator switch RBS (open or closed),—for example 100 μA at a battery voltage $U_{Bat}$ of 13 V.

b) Hazard warning flashing ($t \geq t_1$)

When the hazard warning flasher switch WBS closes,—at time $t_1$—the IC is activated via the control input StE3 (WBK1.) and resistor $R_4$, the relay output 1 of the IC is switched through (switched to the conducting state) by internal logic operations, and the relay contacts WBR and RBR are closed. In accordance with FIG. 2, the voltage $U_1$ at the relay output 1 rises at the time $t_1$ (closing of hazard warning flasher switch WBS) to the value $U_{Bat}-0.9$ V, for example, while at the same time the voltage $U_6$ at the hazard warning flasher input 6 drops at time $t_1$ to approx. $\frac{1}{3}$ of $U_{Bat}$, retaining which value until the time $t_2$—this is the time-lag until the relay contacts close (typically around 2.5 ms).

With the relay contacts closed (time $t_2$), a current flows from the battery BAT via the resistor $R_3$, the relay contact WBR, the resistor $R_7$ and the closed hazard warning flasher switch WBS to the lamps $BL_1$ to $BL_4$. During this so-called "bright phase" H,—from time $t_2$ to time $t_3$ the relay contacts WBR and RBR are closed and the capacitor $C_1$ is charged, as a result of which the voltage $U_4$ at the connecting pin 4 of the IC drops continuously. The voltages at the other connecting pins are, during the "bright phase" H, for example: $U_5$ at pin 5 approx. $U_{Bat}-5.5$ V, $U_7$ at pin 7 approx. $U_{Bat}-160$ mV, $U_6$ at pin $6 = U_{Pin7}-8$ mV, $U_8$ at pin 8 approx. $\frac{1}{3}$ of $U_{Bat}$, and $U_1$ at pin 1 approx. $U_{Bat}-0.9$ V. When the voltage $U_4$ at pin 4 has dropped below a certain value, for example, $U_{Bat}-3.4$ V at the time $t_3$,—the relay output 1 is actuated (the voltage $U_1$ drops to the reference potential).

The relay contacts WBR and RBR of the relay triggered by the relay output 1 are opened and remain in the opened state until the time $t_4$, during the so-called "dark phase" D. At the same time, at time $t_3$, the voltage $U_8$ drops to the reference potential and the voltage $U_6$ to approx. $\frac{1}{3}$ of $U_{Bat}$, while the voltage $U_5$ at pin 5 rises to approx. $U_{Bat}-0.8$ V and voltage $U_7$ at pin 7 rises to $U_{Bat}$. The capacitor $C_1$ is discharged during the dark phase D, accordingly, the voltage $U_4$ rises until the time $t_4$, for example to the value $U_{Bat}-2$ V. The relay output 1 is actuated again at this point, the relay contacts of the relay triggered by relay output 1 are closed, and a new bright phase H starts.

When the ignition switch ZS is open too, the IC is kept activated during both the bright phase and the dark phase by the resistors $R_7$, $R_4$ and $R_8$, the measuring input 7, and the hazard warning flasher input 6.

c) Turn indicator flashing

When the turn indicator switch RBS closes,—with the ignition on (ignition switch ZS closed),—the relay output 1 of the IC is switched through (switched to the conducting state) by the control input $StE_2$ (terminal 49a), the resistors $R_5$ and $R_6$, and the turn indicator input 8, and the relay contacts RBR and WBR are closed by the output signal of the relay output 1 of the IC (bright phase H). As a result, a current flows from the battery BAT via the resistor $R_3$, the relay contact RBR and the closed turn indicator switch RBS to the lamps $BL_1$, $BL_2$ or $BL_3$, $BL_4$ respectively, thereby making the flasher function possible.

The IC is activated by the ignition system via the resistor $R_6$ and the turn indicator input 8.

Figure 3:
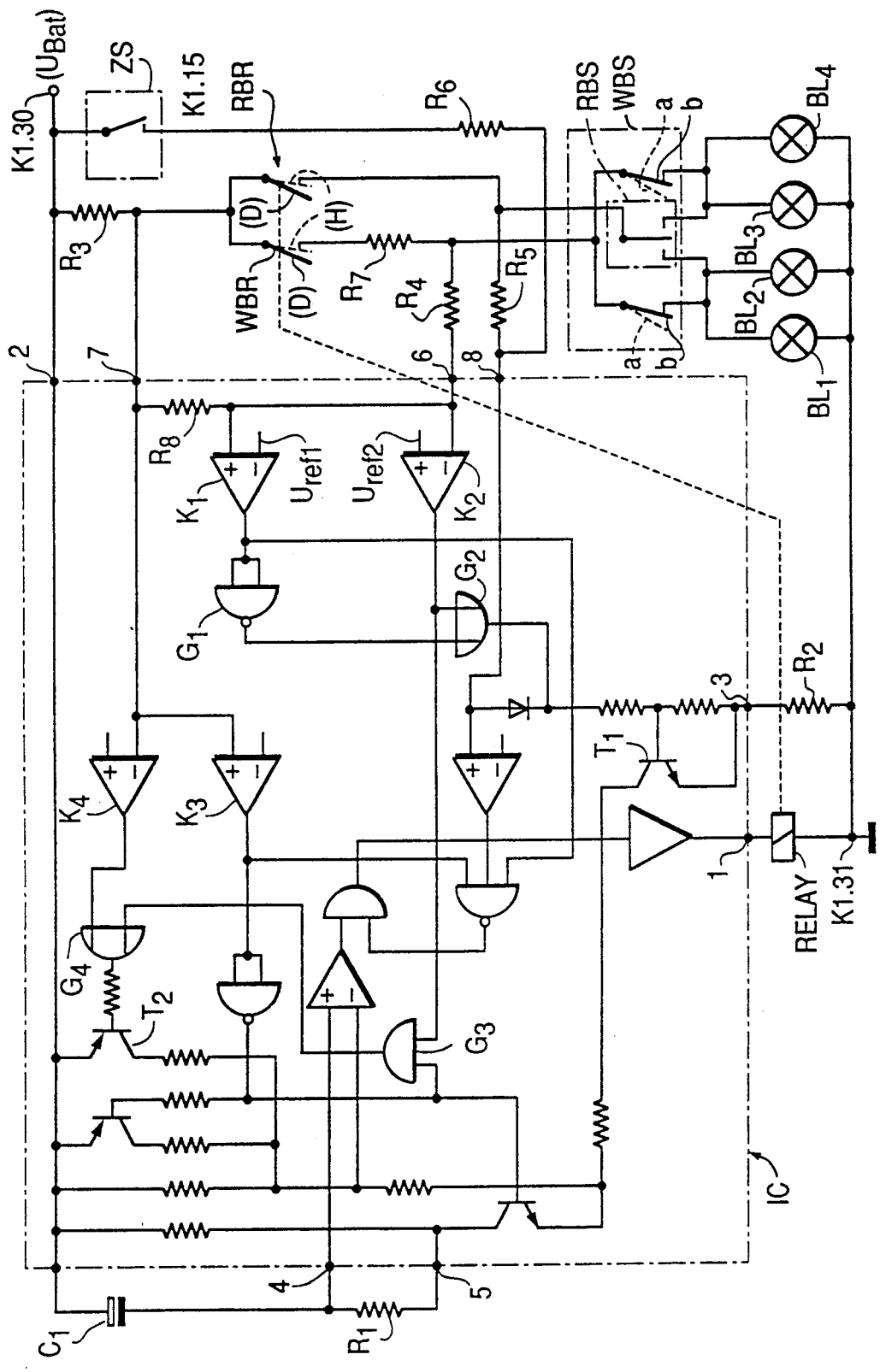
FIG. 3 is a detailed circuit diagram showing the internal structure of the integrated circuit of the flasher unit.

With reference to FIG. 3, the internal wiring of the IC and the resultant logic operations for the various operating states of the flasher unit during the hazard warning flashing function are described:

a) Hazard warning flasher switch WBS open; ignition off (stand-by operation)

When the hazard warning flasher switch WBS is open (setting "a" in FIG. 3) and the ignition switch ZS is open,—the voltages $U_6$ and $U_7$ equal $U_{Bat}$,—the potential $U_{Bat}$ is also applied to the positive input (+) of the comparator $K_1$ and to the negative input (−) of the comparator $K_2$. The reference voltage $U_{Ref1}$ is applied to the negative (−) input of the comparator $K_1$, and the reference voltage $U_{Ref2}$ is applied to the positive input (+) of the comparator $K_2$, these reference voltages being lower than the voltage $U_{Bat}$, for example, $U_{Ref1} = U_{Bat}/2$ and $U_{Ref2} = U_7 - 6$ mV. Accordingly, the output of the comparator $K_1$ is at high level and the output of the comparator $K_2$ at low level. The gate $G_1$ inverts the output signal of the comparator $K_1$, so that both inputs of gate $G_2$ are at low level and accordingly its output also assumes low potential. Since the turn indicator input (pin 8 of the IC) also is changed to reference potential by the resistor $R_6$ when the ignition switch ZS is open (the ignition switch contact is connected with a low resistance to terminal 31 when the ignition is off), the transistor $T_1$ is blocked or off (non-conducting) and the remaining components of the IC are not supplied with current. The IC is thereby generally deactivated, so that the IC power input is very low (typical value < 100 μA). Only the comparator $K_1$ of the IC is supplied with current and kept active, since it is this comparator that recognizes the switch setting of the hazard warning flasher switch WBS.

b) Switch-on of hazard warning flasher switch WBS, ignition off (ignition switch ZS open)

When the hazard warning flasher switch WBS is closed (setting "b" in FIG. 3), the voltage at the positive input (+) of the comparator $K_1$ falls short of the voltage at the negative input ($U_{Ref1}$) due to the voltage drop at the internal resistor $R_8$ and external resistor $R_4$. The output of comparator $K_1$ changes to low level. Because of the inversion of the signal by the gate $G_1$, a high level is applied at the input of gate $G_2$ which causes the output of gate $G_2$ to change to the high level. As a result, the transistor $T_1$ is switched on (conducting).

The IC is therefore activated by the resistors $R_4$, $R_8$, the measuring input 7 and the first comparator $K_1$ when the hazard warning flasher switch WBS is closed, i.e., the remaining comparators, gates and transistors of the IC are supplied with current only when the hazard warning flasher switch WBS is closed.

c) Hazard warning flashing function in operation, bright phase H (relay contacts WBR and RBR closed), ignition off (ignition switch ZS open)

The relay contacts WBR and RBR are closed by the relay output 1 of the IC after activation of the IC (bright phase H). As a result of the voltage drop caused at the voltage divider by the resistors $R_7$, $R_4$ and $R_8$, the negative input ($-$) of the comparator $K_2$ is at a lower potential than the voltage level of the positive input ($+$). The output of the comparator $K_2$ is hence always at high level when the relay contacts are closed, so that the IC is kept active during the bright phase H by the gate $G_2$ and the transistor $T_1$, regardless of the output signal of the comparator $K_1$ after switch-on of the IC.

The frequency doubling set using the comparator $K_4$ must be blocked during hazard warning flashing. This is achieved during the bright phase H by the transistor $T_2$ being switched off (non-conductive) by the gates $G_3$ and $G_4$ and comparators $K_2$, $K_3$ and $K_4$.

The second comparator $K_2$, therefore, on the one hand ensures that the IC remains activated, even when the ignition switch ZS is open (the IC could otherwise change to an oscillating operation), and on the other hand deactivates the increase in the flashing lamp frequency when the hazard warning flasher switch is closed.

d) Hazard warning flashing function in operation, dark phase D (relay contacts WBR and RBR opened), ignition off (ignition switch is open)

The relay contacts are opened by the relay output 1 of the IC. The IC is therefore kept activated by the comparator $K_1$.

What is claimed is:

1. An electronic flasher unit for controlling a plurality of flashing lamps and connectable to a battery, an ignition switch connected to the battery, a turn indicator switch, a hazard warning flasher switch, and a grounding point, said electronic flasher unit comprising:
   a battery terminal connectable to the battery;
   a ground terminal connectable to the grounding point;
   at least a first, a second, and a third control input terminal connectable respectively to the ignition switch, the turn indicator switch, and the hazard warning flasher switch;
   a flashing relay having a plurality of relay contacts that are connected respectively to said second and said third control input terminals;
   an integrated circuit which has a first connecting pin which controls said flashing relay, a second connecting pin which is a measuring input and is connected to said plurality of relay contacts and is also connected, via a measuring resistor, to said battery terminal, a third connecting pin which is a hazard warning flasher input and is connected, via an inner resistor which is inside said integrated circuit, to said second connecting pin and is also connected, via a first resistor, to said third control input terminal, and a fourth connecting pin which is a turn indicator input and is connected, via a second resistor, to said second control input terminal;
   a plurality of resistors coupled to said first, said second, and said third control input terminals, wherein said plurality of resistors output a plurality of voltage drops in response to the input of at least a first, a second, and a third switch setting signal from said first, said second, and said third control input terminals, respectively; and
   a switching means, within said integrated circuit, coupled to said plurality of resistors via a plurality of connecting pins of said integrated circuit, to change the operating state of said integrated circuit in response to said plurality of voltage drops from said plurality of resistors.

2. An electronic flasher unit according to claim 1, wherein said integrated circuit has eight external of said connecting pins.

3. An electronic flasher unit according to claim 2, wherein said integrated circuit has an eight-pin housing.

4. An electronic flasher unit according to claim 1, wherein said measuring input and said hazard warning flasher input receive input from said plurality of voltage drops that are evaluated by said switching means in said integrated circuit, and wherein said integrated circuit is activated or deactivated on the basis of said evaluation in response to said first switch setting signal indicating the ignition switch is open.

5. An electronic flasher unit according to claim 4, wherein said switching means includes a first comparator having a positive input connected via said inner resistor to said measuring input of said integrated circuit and having a negative input connected to a first reference voltage.

6. An electronic flasher unit according to claim 5, wherein an output of said first comparator is connected to a first and a second input of a first gate, wherein an output of said first gate is connected to a first input of a second gate, and wherein a first transistor is actuated at an output of said second gate.

7. An electronic flasher unit according to claim 6, wherein only said first comparator is active in said integrated circuit when said first and said third switch setting signals are not input, indicating that the ignition switch and the hazard warning flasher switch are open.

8. An electronic flasher unit according to claim 7, wherein said first transistor, said first gate and said second gate when said first and said third switch setting signals are not input, indicating that the ignition switch and the hazard warning flasher switch are open, as a result of which further components of said integrated circuit are not supplied with current.

9. An electronic flasher unit according to claim 6, wherein further components of said integrated circuit are activated by said first comparator when said third switch setting signal is input, indicating that the hazard warning flasher switch is closed while said first switch setting signal is not input, indicating that the ignition switch and said plurality of relay contacts are open.

10. An electronic flasher unit according to claim 9, wherein when said third switch setting signal is low, indicating that the hazard warning flasher switch is closed, said first transistor is turned on by said first gate and said second gate, so that further components of said integrated circuit are supplied with current.

11. An electronic flasher unit according to claim 6, wherein said hazard warning flasher input is connected via a serial connection of said first resistor and a third resistor to said plurality of relay contacts.

12. An electronic flasher unit according to claim 11, wherein an input signal at said hazard warning flasher input is evaluated by said switching means, so that when said third switch setting signal is low, indicating that the hazard warning flasher switch is closed, a frequency increase in a flashing lamp frequency is blocked, and when said third switch setting signal is low, indicating that the hazard warning flasher switch is closed, and said first switch setting signal is not input, indicating that the ignition switch is open, said integrated circuit is kept activated.

13. An electronic flasher unit according to claim 12, wherein said switching means has a second comparator having a negative input connected to the positive input of said first comparator, to said inner resistor and to said hazard warning flasher input, and having a positive input connected to a second reference voltage.

14. An electronic flasher unit according to claim 13, wherein an output of said second comparator is connected to a second input of said second gate, wherein said integrated circuit is kept activated by the output signal of said second comparator when said third switch setting signal is low, indicating that the hazard warning flasher switch and said first switch setting signal is not input, indicating that the ignition switch is open and said plurality of relay contacts are closed, and wherein with said plurality of relay contacts closed said frequency increase of said flashing lamp frequency is blocked.

15. An electronic flasher unit according to claim 14, wherein said turn indicator input is connected via a fourth resistor, to said first control input terminal ignition switch, and also connected, via said second resistor, to one of said plurality of relay contacts and to the turn indicator switch.

16. An electronic flasher unit according to claim 1, wherein said flasher unit has three control input terminals.

* * * * *